Oct. 21, 1958     H. A. BARCLAY     2,857,451
CASE FOR WELL LOGGING TOOLS
Filed Aug. 8, 1952
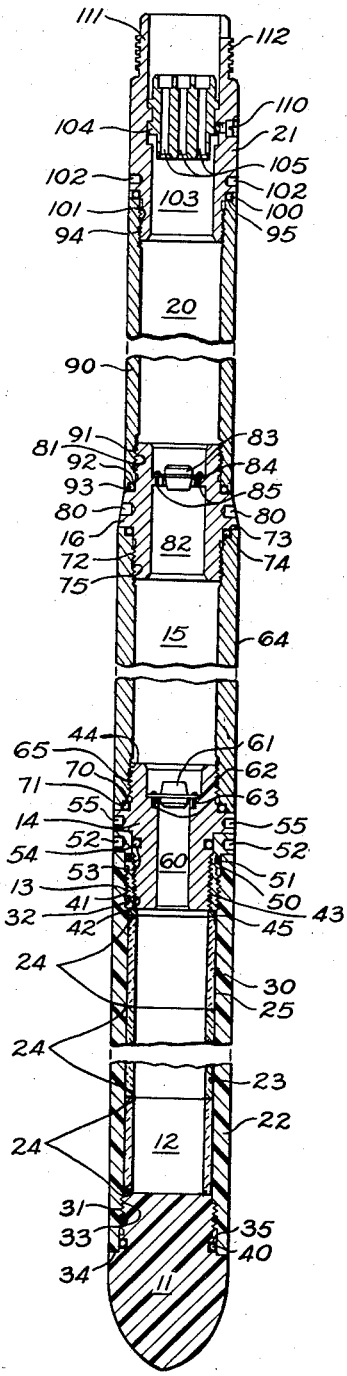
HARRY A. BARCLAY
INVENTOR.
BY Frederick E. Dumoulin
ATTORNEY

United States Patent Office 2,857,451
Patented Oct. 21, 1958

2,857,451

CASE FOR WELL LOGGING TOOLS

Harry A. Barclay, Dallas, Tex., assignor, by mesne assignments, to Socony Mobil Oil Company, Inc., a corporation of New York Application August 8, 1952, Serial No. 303,446

16 Claims. (Cl. 174—52)

This invention relates to a case and relates more particularly to a case for a well logging tool.

Well logging tools are used extensively in determining various physical properties of subterranean strata penetrated by a well bore hole. Among the physical properties of the subterranean strata determined are magnetic permeability, magnetic susceptibility, dielectric constant, and electrical resistivity, and these and other electromagnetic properties are determined by lowering a well logging tool capable of making the desired determination into the well bore hole to the desired strata. The well logging tools employed for determining the above-mentioned and other properties of the subterranean strata are commonly electrically operated and contain a coil, condenser, or other sensitive element which is electrically responsive to the physical properties of the subterranean strata, and, by measurement or recordation of the responses of the sensitive element, information as to the physical properties of the subterranean strata is obtained. Where the responsiveness of the sensitive element is affected by the pressure in the well bore hole, as by being deformed thereby, or by contact with the walls of the well bore hole, a protective case must be provided for at least the sensitive element of the well logging tool. However, a case for well logging tools must not only protect the sensitive element from the pressure in the well bore hole and from contact with the walls of the well bore hole but also must not interfere with the responsiveness of the sensitive element to the physical properties of the subterranean strata. Where the responsiveness of the sensitive element depends upon the creation or existence of a magnetic or electric field, the case must not only have sufficient mechanical strength to withstand well bore hole pressures and to withstand pulling forces encountered in operation of the tool but must also be non-magnetic and electrically non-conductive in order to avoid interference with the responsiveness of the sensitive element.

It is a primary object of this invention to provide a case for a well logging tool. It is another object of this invention to provide a non-magnetic and non-conductive housing for the sensitive element of a well logging tool. These and other objects of the invention will become apparent from the following description thereof.

The single figure is a sectional elevation of a case for a well logging tool constructed in accordance with the invention.

Referring now to the drawing, the case comprises generally a nose or closure 11, a sensitive element housing 12, a bushing 13, an adaptor 14, a compartment 15, an adaptor 16, an instrument case 20, and a cable adaptor 21. The sensitive element housing 12 will contain the coil, condenser, or other sensitive element of the well logging tool.

The sensitive element housing is non-magnetic and non-conductive and comprises an outer cylinder 22 and a plurality of inner cylinders 23. The outer cylinder 22 is formed of a thermosetting plastic material and preferably is formed from layers of paper, spun glass, asbestos, fabric, etc., impregnated with a thermosetting resin such as phenol formaldehyde bonded together by the application of heat and pressure. The inner cylinders 23 are formed of a ceramic material, preferably a vitreous ceramic material. Suitable types of vitreous ceramic materials include steatite, forsterite, titanium dioxide, zircon, and alumina. The inner cylinders 23 are ground square at their ends 24 to provide an even fit with abutting surfaces, and the inside surface 25 of the outer cylinder 22 and the outside surface 30 of the cylinders 23 are ground or otherwise dimensioned to provide a press fit of the inner cylinders into the outer cylinder. By virtue of the inner cylinders 23, the instrument housing 12 is capable of withstanding the pressures encountered in a well bore hole without deformation and by virtue of the outer cylinder 22 the instrument housing is impervious to leakage of well fluids and is capable of withstanding mechanical shock and pulling forces encountered during operation of the well logging tool.

The inner cylinders 23 extend along the inner length of the outer cylinder 22 except at the ends thereof and the ends of the outer cylinder are internally threaded to provide threads 31 and threads 32. Fitting into the lower end of the outer cylinder is nose 11 provided with threads 33 to cooperate with threads 31. The nose 11 is shaped to make an even fit with the abutting end 24 of the inner cylinder 23 and with the abutting end 34 of the outer cylinder 22, and the outer surface of the nose is flush with the outer surface of the outer cylinder. The nose 11 is provided with gasket groove 35 containing gasket 40 to prevent leakage of well fluids between the abutting surfaces of the nose and the outer cylinder and the nose is formed of a thermosetting plastic material of the same general type as the outer cylinder 22.

In place of the plurality of inner cylinders 23, a single cylinder of desired length formed from ceramic material may be employed. Where a single inner cylinder of desired length formed from ceramic material is employed, the outer cylinder 22 is preferably molded around the inner cylinder, although, if desired, the inner cylinder may be pressed into the outer cylinder. The two ends of the single cylinder are ground square to provide an even fit with abutting surfaces of other elements.

Fitting into the other end of the outer cylinder 22 is bushing 13 provided with external threads 41 cooperating with threads 32 and provided with internal threads 42. Fitting within bushing 13 is adaptor 14 provided with threads 43 cooperating with threads 42 and provided with threads 44. A spacer ring 45 is positioned between bushing 13 and the end 24 of inner cylinder 23. The spacer ring fits evenly against the squared end of the cylinder, whether a single cylinder or a plurality of cylinders are employed and the spacer ring insures that upon tightening of nose 11 and outer cylinder 22, where a single inner cylinder is employed, the inner cylinder is in tight axial contact with abutting surfaces at each end, and where a plurality of cylinders is employed, the two end cylinders are in tight axial contact with abutting surfaces of other elements and each cylinder is in tight axial contact with its adjacent cylinder, whereby intrusion of cylinder 22 between abutting surfaces of the inner cylinder or cylinders or between the abutting surfaces of adjacent cylinders under well pressures is prevented. The bushing 13 is provided with a gasket groove 50 containing gasket 51 to prevent leakage of well fluids between the abutting surfaces of the outer cylinder 22 and the bushing 13 and is provided with a plurality of recesses 52 to accommodate a tool for tightening the bushing. The adaptor 14 is provided with gasket groove 53 containing gasket 54 to prevent leakage of well fluids between the abutting surfaces of the bushing and the adaptor, and the adaptor is provided with a plurality of recesses 55 to accommodate a tool for tightening the adaptor. The adaptor contains a central channel 60 to accommodate a cable (not shown) leading to the sensitive element to be contained within the housing 12 and a socket 61 is affixed at one end of the channel by means of plate 62 supported on the adaptor by means of screws 63. The bushing 13 and the adaptor 14 need not be non-magnetic and non-conductive and can be formed of a metal such as brass or stainless steel.

For a well logging instrument which contains coils, condensers, or other elements forming a bridge network with the sensitive element contained in the housing 12, and where these coils or other elements are to be housed within a heat insulated chamber or container (not shown) to minimize temperature changes which would interfere with their effective operation, the case is provided with compartment 15 to hold the heat insulated chamber or container. Compartment 15 is formed of cylinder 64 provided with internal threads 65 near one end thereof to cooperate with threads 44 of adaptor 14 and cylinder 64 is threadedly engaged with adaptor 14. A gasket groove 70 containing gasket 71 is provided at the end of cylinder 64 abutting against adaptor 14 in order to prevent leakage of well fluids through the contacting surfaces of the adaptor and the cylinder, and the abutting faces of adaptor 14 and cylinder 64 are shaped to make an even fit. Threads 72 are provided internally near the other end of cylinder 64 and a gasket groove 73 containing gasket 74 is provided at the same end of the cylinder. Cylinder 64 may be formed of any suitable metal such as brass or stainless steel.

Adaptor 16 is provided with external threads 75 to cooperate with threads 72 of cylinder 64 and is threadedly fitted into cylinder 64. The abutting faces of adaptor 16 and cylinder 64 are shaped to make an even fit and the gasket 74 serves to prevent leakage of well fluid between the abutting surfaces of the adaptor and the cylinder. A plurality of recesses 80 are provided in adaptor 16 to accommodate a tool for tightening the adaptor, and the adaptor is also provided with external threads 81. The adaptor contains a central channel 82 to accommodate a cable or cables (not shown) leading to compartment 15 and socket 83 is affixed at one end of the channel by means of plate 84 supported on the adaptor by means of screws 85. The adaptor may be formed of a suitable metal such as stainless steel or brass.

Cylinder 90 forming instrument case 20 to contain elements of the well logging instrument not contained in housing 12 and compartment 15 is provided with internal threads 91 to cooperate with threads 81 of adaptor 16 and is threadedly engaged with adaptor 16. Gasket groove 92 containing gasket 93 is provided at one end of the cylinder to prevent leakage of well fluid between the abutting surfaces of adaptor 16 and cylinder 90. The other end of cylinder 90 is provided with internal threads 94 and gasket groove 95 containing gasket 100. The cylinder 90 may be formed of a suitable metal such as brass or stainless steel.

Cable adaptor 21 is provided with external threads 101 to cooperate with threads 94 of cylinder 90, and with a plurality of recesses 102 to accommodate a tool for tightening the adaptor, and threadedly engages cylinder 90. The abutting faces of adaptor 21 and cylinder 90 are shaped to make an even fit and the gasket 100 serves to prevent leakage of well fluid between the abutting surfaces of the adaptor and the cylinder. The adaptor 21 contains a central channel 103 into which is rotatably locked contact retainer 104 provided with a plurality of channels 105 to accommodate cables leading to elements within the instrument case 20. A set screw 110 is provided at the side of adaptor 21 to prevent turning of cable retainer 104 and the end portion 111 of the adaptor is provided with threads 112 to threadedly engage a conventional well tool cable grasp.

As stated, the sensitive element housing 12 will contain the coil, condenser, or other sensitive element of the well logging tool. While the housing 12 is adapted to contain any type of sensitive element, it is particularly suitable for containing the sensitive element employed in induction logging systems of the type disclosed in Patent No. 2,535,666 to Robert A. Broding, issued December 26, 1950, wherein the sensitive element is a magnetic coil. The housing is also particularly suitable for containing a capacitive element employed as a sensitive element to respond to variations in physical properties of subterranean strata, such as the capacitive element disclosed and claimed in the copending application of Carl W. Zimmerman, Serial No. 189,818, filed October 12, 1950, now Patent No. 2,689,329, issued September 14, 1954.

Having thus described my invention, it will be understood that such description has been given by way of illustration and example and not by way of limitation, reference for the latter purpose being had to the appended claims.

I claim:

1. In a well logging tool having a sensitive element whose responsiveness to electromagnetic properties of subterranean strata penetrated by a well bore hole is affected by pressure in said well bore hole or by contact with the wall of said well bore hole, a housing for said sensitive element comprising a closed chamber having an inner ceramic wall and an outer plastic wall surrounding said inner ceramic wall and in contact therewith for the entire length of said ceramic wall, said outer plastic wall fixedly engaging an adjacent element of said well logging tool.

2. In a well logging tool having a sensitive element whose responsiveness to electromagnetic properties of subterranean strata penetrated by a well bore hole is affected by pressure in said well bore hole or by contact with the wall of said well bore hole, a housing for said sensitive element comprising a closed chamber having an inner ceramic wall and an outer plastic wall molded to and surrounding said inner ceramic wall for the entire length of said ceramic wall, said outer plastic wall fixedly engaging an adjacent element of said well logging tool.

3. In a well logging tool having a sensitive element whose responsiveness to electromagnetic properties of subterranean strata penetrated by a well bore hole is affected by pressure in said well bore hole or by contact with the wall of said well bore hole, a housing for said sensitive element comprising a hollow ceramic cylinder open at both ends and a hollow plastic cylinder surrounding and in contact with said hollow ceramic cylinder for the entire length of said hollow ceramic cylinder, said hollow plastic cylinder being open at one end and fixedly engaging in fluid-tight relationship at said end an adjacent element of said well logging tool and said hollow plastic cylinder being closed at its other end.

4. In a well logging tool having a sensitive element whose responsiveness to electromagnetic properties of subterranean strata penetrated by a well bore hole is affected by pressure in said well bore hole or by contact with the wall of said well bore hole, a housing for said sensitive element comprising a hollow ceramic cylinder open at both ends, a hollow plastic cylinder surrounding and in contact with said hollow ceramic cylinder for the entire length of said hollow ceramic cylinder, said hollow plastic cylinder being open at one end and fixedly engaging in fluid-tight relationship at said end an adjacent element of said well logging tool, and a fluid-tight closure for said hollow plastic cylinder at its other end.

5. In a well logging tool having a sensitive element whose responsiveness to electromagnetic properties of subterranean strata penetrated by a well bore hole is affected by pressure in said well bore hole or by contact with the wall of said well bore hole, a housing for said sensitive element comprising a hollow ceramic cylinder open at both ends and a hollow plastic cylinder surrounding and in contact with said hollow ceramic cylinder for the entire length of said hollow ceramic cylinder, said hollow plastic cylinder being open at one end and extending at said end longitudinally beyond the end of said hollow ceramic cylinder and fixedly engaging in fluid-tight relationship at said end an adjacent element of said well logging tool, and said hollow plastic cylinder extending at its other end longitudinally beyond the other end of said hollow ceramic cylinder and being closed at said end.

6. In a well logging tool having a sensitive element whose responsiveness to electromagnetic properties of subterranean strata penetrated by a well bore hole is affected by pressure in said well bore hole or by contact with the wall of said well bore hole, a housing for said sensitive element comprising a hollow ceramic cylinder open at both ends, a hollow plastic cylinder surrounding and in contact with said hollow ceramic cylinder for the entire length of said hollow ceramic cylinder, said hollow plastic cylinder being open at one end and threadedly engaging in fluid-tight relationship at said end an adjacent element of said well logging tool, and a plastic closure for said hollow plastic cylinder threadedly engaging in fluid-tight relationship said hollow plastic cylinder at its other end.

7. In a well logging tool having a sensitive element whose responsiveness to electromagnetic properties of subterranean strata penetrated by a well bore hole is affected by pressure in said well bore hole or by contact with the wall of said well bore hole, a housing for said sensitive element comprising a hollow vitreous ceramic cylinder open at both ends, a hollow thermosetting resin cylinder surrounding and in contact with said hollow vitreous ceramic cylinder for the entire length of said hollow vitreous ceramic cylinder, said hollow plastic cylinder being open at one end and fixedly engaging in fluid-tight relationship at said end an adjacent element of said well logging tool, and a thermosetting resin closure engaging in fluid-tight relationship said hollow thermosetting resin cylinder at its other end.

8. In a well logging tool having a sensitive element whose responsiveness to electromagnetic properties of subterranean strata penetrated by a well bore hole is affected by pressure in said well bore hole or by contact with the wall of said well bore hole, a housing for said sensitive element comprising a hollow ceramic cylinder open at both ends, a hollow plastic cylinder surrounding and in contact with said hollow ceramic cylinder for the entire length of said hollow ceramic cylinder, internal threads on said hollow plastic cylinder near one end thereof engaging in fluid-tight relationship an adjacent element of said well logging tool, a gasket between said hollow plastic cylinder and said adjacent element of said well logging tool, internal threads on said hollow plastic cylinder near its other end thereof, a plastic closure for said hollow plastic cylinder, threads on said plastic cylinder engaging in fluid-tight relationship said last mentioned internal threads on said hollow plastic cylinder, and a gasket between said plastic closure and said hollow plastic cylinder.

9. In a well logging tool having a sensitive element whose responsiveness to electromagnetic properties of subterranean strata penetrated by a well bore hole is affected by pressure in said well bore hole or by contact with the wall of said well bore hole, a housing for said sensitive element comprising a closed chamber having an inner wall formed of a ceramic material and an outer wall formed of a plastic material impregnated into layers of fibrous material surrounding said inner ceramic wall and in contact therewith for the entire length of said ceramic wall, said layers of fibrous material being bonded together by said plastic material and said outer plastic wall fixedly engaging an adjacent element of said well logging tool.

10. In a well logging tool having a sensitive element whose responsiveness to electromagnetic properties of subterranean strata penetrated by a well bore hole is affected by pressure in said well bore hole or by contact with the wall of said well bore hole, a housing for said sensitive element comprising a single hollow ceramic cylinder open at both ends and a hollow plastic cylinder surrounding and in contact with said single hollow ceramic cylinder for the entire length of said single hollow ceramic cylinder, said hollow plastic cylinder being open at one end and fixedly engaging in fluid-tight relationship at said end and adjacent element of said well logging tool and said hollow plastic cylinder being closed at its other end.

11. In a well logging tool having a sensitive element whose responsiveness to electromagnetic properties of subterranean strata penetrated by a well bore hole is affected by pressure in said well bore hole or by contact with the wall of said well bore hole, a housing for said sensitive element comprising a plurality of hollow ceramic cylinders open at both ends and in end-to-end contact and a hollow plastic cylinder surrounding and in contact with said plurality of hollow ceramic cylinders for the entire length of said plurality of hollow ceramic cylinders, said hollow plastic cylinder being open at one end and fixedly engaging in fluid-tight relationship at said end an adjacent element of said well logging tool and said hollow plastic cylinder being closed at its other end.

12. In a well logging tool having a sensitive element whose responsiveness to electromagnetic properties of subterranean strata penetrated by a well bore hole is affected by pressure in said well bore hole or by contact with the wall of said well bore hole, a housing for said sensitive element comprising a plurality of hollow ceramic cylinders open at both ends and in end-to-end contact, a hollow plastic cylinder surrounding and in contact with said plurality of hollow ceramic cylinders for the entire length of said plurality of hollow ceramic cylinders, said hollow plastic cylinder being open at one end and fixedly engaging in fluid-tight relationship at said end an adjacent element of said well logging tool, and a fluid-tight closure for said hollow plastic cylinder at its other end.

13. In a well logging tool having a sensitive element whose responsiveness to electromagnetic properties of subterranean strata pentrated by a well bore hole is affected by pressure in said well bore hole or by contact with the wall of said well bore hole, a housing for said sensitive element comprising a plurality of hollow ceramic cylinders open at both ends and in end-to-end contact and a hollow plastic cylinder surrounding and in contact with said plurality of hollow ceramic cylinders for the entire length of said plurality of hollow ceramic cylinders, said hollow plastic cylinder being open at one end and extending at said end longitudinally beyond the end of said plurality of hollow ceramic cylinders and fixedly engaging in fluid-tight relationship at said end an adjacent element of said well logging tool, and said hollow plastic cylinder extending at its other end longitudinally beyond the other end of said plurality of hollow ceramic cylinders and being closed at said end.

14. In a well logging tool having a sensitive element whose responsiveness to electromagnetic properties of subterranean strata penetrated by a well bore hole is affected by pressure in said well bore hole or by contact with the wall of said well bore hole, a housing for said sensitive element comprising a plurality of hollow ceramic cylinders open at both ends and in end-to-end contact, a hollow plastic cylinder surrounding and in contact with said plurality of hollow ceramic cylinders for the entire length of said plurality of hollow ceramic cylinders, said hollow plastic cylinder being open at one end and threadedly engaging in fluid-tight relationship at said end an adjacent element of said well logging tool, and a plastic closure for said hollow plastic cylinder threadedly engaging in fluid-tight relationship said hollow plastic cylinder at its other end.

15. In a well logging tool having a sensitive element whose responsiveness to electromagnetic properties of subterranean strata pentrated by a well bore hole is affected by pressure in said well bore hole or by contact with the wall of said well bore hole, a housing for said sensitive element comprising a plurality of hollow vitreous ceramic cylinders open at both ends and in end-to-end contact, a hollow thermosetting resin cylinder surrounding and in contact with said plurality of hollow ceramic cylinders for the entire length of said plurality of hollow ceramic cylinders, said hollow thermosetting resin cylinder being open at one end and fixedly engaging in fluid-tight relationship at said end an adjacent element of said well logging tool, and a thermosetting resin closure for said plastic cylinder fixedly engaging in fluid-tight relationship said hollow thermosetting resin cylinder at its other end.

16. In a well logging tool having a sensitive element whose responsiveness to electromagnetic properties of subterranean strata penetrated by a well bore hole is affected by pressure in said well bore hole or by contact with the wall of said well bore hole, a housing for said sensitive element comprising a plurality of hollow ceramic cylinders open at both ends and in end-to-end contact, a hollow plastic cylinder surrounding and in contact with said plurality of hollow ceramic cylinders for the entire length of said plurality of hollow ceramic cylinders, internal threads on said hollow plastic cylinder near one end thereof engaging in fluid-tight relationship an adjacent element of said well logging tool, a gasket between said hollow plastic cylinder and said adjacent element of said well logging tool, internal threads on said hollow plastic cylinder near its other end thereof, a plastic closure for said hollow plastic cylinder, threads on said plastic cylinder engaging in fluid-tight relationship said last mentioned internal threads on said hollow plastic cylinder, and a gasket between said plastic closure and said hollow plastic cylinder.

References Cited in the file of this patent

UNITED STATES PATENTS

| 1,955,855 | Marx | Apr. 24, 1934 |
| 2,297,828 | Flatford | Oct. 6, 1942 |
| 2,401,280 | Walstrom | May 28, 1946 |
| 2,413,651 | Petty | Dec. 31, 1946 |
| 2,424,990 | Krim | Aug. 5, 1947 |
| 2,425,869 | Dillon | Aug. 19, 1947 |
| 2,689,329 | Zimmerman | Sept. 14, 1954 |

FOREIGN PATENTS

| 609,266 | Great Britain | Sept. 28, 1948 |